United States Patent
Kihara et al.

[11] Patent Number: 5,936,036
[45] Date of Patent: Aug. 10, 1999

[54] RUBBER-MODIFIED STYRENIC RESIN COMPOSITION AND MOLDED ARTICLE THEREOF

[75] Inventors: Hayato Kihara; Takahiro Ishii; Kenji Atarashi, all of Chiba, Japan

[73] Assignee: Sumitomo Chemical Company, Limited, Osaka, Japan

[21] Appl. No.: 08/941,575

[22] Filed: Sep. 30, 1997

[30] Foreign Application Priority Data

Oct. 1, 1996 [JP] Japan ..................................... 8-260923

[51] Int. Cl.$^6$ .............................. C08L 51/04; C08L 23/08
[52] U.S. Cl. ................................ 525/74; 525/78; 525/84; 525/316; 521/139
[58] Field of Search ............................... 521/139; 525/74, 525/78, 84, 316

[56] References Cited

U.S. PATENT DOCUMENTS

| | | |
|---|---|---|
| 4,098,734 | 7/1978 | Lee . |
| 4,513,120 | 4/1985 | Bennett ................................... 525/316 |
| 4,529,563 | 7/1985 | McGinniss . |
| 4,739,001 | 4/1988 | Okamoto et al. . |
| 4,925,896 | 5/1990 | Matarrese ................................ 525/316 |
| 5,364,908 | 11/1994 | Oishi . |

FOREIGN PATENT DOCUMENTS

| | | |
|---|---|---|
| 0113067 | 7/1984 | European Pat. Off. . |
| 6228357 | 8/1994 | Japan . |
| 329735 | 11/1994 | Japan . |
| 8151500 | 6/1996 | Japan . |
| 9087444 | 3/1997 | Japan . |
| 9087462 | 3/1997 | Japan . |
| 9095587 | 4/1997 | Japan . |

OTHER PUBLICATIONS

Angewandte Macromolekulare Chemie 90 (1980) 95–108.
Chem. Rev. 8, 321 (1931).
Journal of Applied Chemistry, 3, pp. 71 to 80 (1953).

*Primary Examiner*—David Buttner
*Attorney, Agent, or Firm*—Stevens, Davis, Miller & Mosher, L.L.P.

[57] ABSTRACT

There is provided a rubber-modified styrenic resin composition comprising a rubber-modified styrenic resin containing soft component particles of a salami structure and a polymer having a predetermined solubility parameter, which is much more improved in both of plane impact resistance and Izod impact resistance, while retaining a high level of other properties such as rigidity, gloss and moldability.

13 Claims, No Drawings

RUBBER-MODIFIED STYRENIC RESIN COMPOSITION AND MOLDED ARTICLE THEREOF

The present invention relates to a rubber-modified styrenic resin composition exhibiting much more improved impact resistance, and a molded article thereof.

More specifically, the present invention relates to a rubber-modified styrenic resin composition capable of giving a molded article much more improved in both of plane impact and Izod impact resistances, while retaining a high level of other properties such as gloss and rigidity, and a molded article comprising the same.

A rubber-modified styrenic resin composed of a polystyrene matrix and soft component particles dispersed therein is known as a high impact polystyrene (HIPS). The high impact polystyrene is extensively useful, because it exhibits improved impact resistance, while retaining rigidity and moldability bearing comparison with a conventional polystyrene.

However, when used as an armoring material for office automation equipments and household electric appliances, the high impact polystyrene(HIPS) is required to be further improved in impact resistance, while retaining a high level of gloss. Also in the fields of packaging and cushioning materials, further improved impact resistance is required.

In order to improve the impact resistance, Okamoto et al.' U.S. Pat. No. 4,739,001 proposes addition of an organopolysiloxane and an ethylene-unsaturated carboxylic acid ester copolymer to a rubber-modified styrenic resin.

Further, Yoshimi et al.'s JP-A (Japanese Patent Kokai) No.8-151500 discloses addition of a polymer having a solubility parameter(SP) of 8.45 to 8.70 and comprising no aromatic vinyl compound to a rubber-modified styrenic resin comprising soft component particles of a single occulusion structure, whereby a plane impact resistance and gloss are improved simultaneously.

In recent years, however, the rubber-modified styrenic resin is required to be much more improved in both of plane impact resistance and Izod impact resistance, while retaining a high level of gloss and rigidity.

An object of the present invention is to solve the above mentioned problems and to provide a rubber-modified styrenic resin composition exhibiting much more improved plane impact and Izod impact resistances simultaneously at low cost, while retaining a high level of rigidity and gloss, as well as superior moldability bearing comparison with a conventional high impact polystyrene(HIPS).

The present invention provides a rubber-modified styrenic resin composition comprising 100 parts by weight of a rubber-modified styrenic resin as a component (A) and 0.1 part by weight or more of a polymer as a component (B), the component (A) being obtainable by forming a liquid mixture of a rubbery polymer and a styrenic monomer, and subjecting the liquid mixture to polymerization, thereby obtaining the desired component (A), in which soft component particles containing the rubbery polymer are dispersed, said soft component particles having a salami structure and a weight average particle size of from 0.1 to 0.6 μm, and a content of said soft component particles being from 20 to 35% by weight based on the weight of the component (A), and the component (B) having a solubility parameter (SP) of from 8.45 to 8.70 and comprising no aromatic vinyl compound unit.

The present invention also provides an injection molded article, an extrusion molded article and a foam article comprising the foregoing rubber-modified styrenic resin composition.

The present invention is illustrated in detail as follows.

The styrenic monomer used in the preparation of the component (A) includes styrene and a $C_{1-4}$ alkyl-substituted styrene such as α-methylstyrene, o-methylstyrene, m-methylstyrene, p-methylstyrene and the like. The styrenic monomer is used singly or in a mixture of two or more. Of these, styrene is preferable.

In the present invention, a compound copolymerizable with the styrenic monomer can be used in combination with the styrenic monomer to obtain the desired component (A). Examples thereof are vinyl monomers such as acrylonitrile, methacrylonitrile, methacrylic acid, methyl methacrylate and the like, maleic anhydride, maleimide, nucleus substituted maleimide and the like.

As the rubbery polymer used for the preparation of the component (A), there are exemplified polybutadiene, butadiene-styrene copolymer, polyisoprene, natural rubber and the like. Among them, preferred are polybutadiene rubbers and butadiene-styrene block copolymers having a styrene content of less than 15% by weight. Of these, polybutadiene rubbers are more preferably used. Of these polybutadiene rubbers, more preferable is one having a viscosity of from 20 to 200 cps, and much more preferable is from 30 to 100 cps. When such polybutadiene rubber is used in the present invention, the component (A) can be obtained advantageously from an industrial point of view, because no powerful stirring is required, and moreover the impact resistance can be greatly improved. A measurement of the viscosity is carried out for a 5% by weight styrene solution of the polybutadiene rubber at a temperature of 25° C. in a conventional manner.

In the present invention, the soft component particles dispersed in the component (A) should have a salami structure (which is also referred to as a cellular structure), in which a plurality of styrenic resin fine particles is dispersed within a continuous phase of the rubbery polymer. With regard to the other structures of the soft component particles, there are well known a so-called single occlusion structure in which a single continuous phase of the styrenic resin is occluded within a continuous phase of the rubbery polymer (which is also referred to as a core-shell structure or capsule structure), a dot structure, a dot flocculated structure and the like(see, for example, Angewande Makromolekulare Chemie, 90, 1980, pp 95–108). The salami structure in accordance with the present invention peculiarly affords a rubber-modified styrenic resin composition exhibiting much more improved impact resistance.

A content of the soft component particles in the component (A) is from 20 to 35% by weight based on the weight of the component (A). When the content is less than 20% by weight, the impact resistance is not sufficiently improved, while when it exceeds 35% by weight, the rigidity tends to decrease.

The content of the soft component particles is measured as follows.

About 0.5 g of a sample, the component (A) is accurately weighed (weight: W1), and the weighed sample is dissolved in 50 ml of a mixed solvent of methyl ethyl ketone/methanol (10/1 ratio by volume) at room temperature (23° C.). Then, undissolved components are isolated by centrifugation, dried and weighed (weight: W2). The content is calculated by the following formula:

$$(W2/W1) \times 100 \text{ (\% by weight)}.$$

A weight average particle size of the soft component particles dispersed in the component (A) is from 0.1 to 0.6 µm. When the particle size is less than 0.1 µm, the impact resistance is not sufficiently improved, while when it exceeds 0.6 µm, appearance of a molded article such as gloss tends to lower.

In the present invention, it is preferred to adjust the particle size of the soft component particles within a range of from 1.1 to 1.8 in terms of a ratio of the foregoing weight average particle size to a number average particle size (weight average particle size/number average particle size), whereby a gloss/impact resistance balance is much more improved.

The number average particle size and the weight average particle size are defined as follows.

A very thin slice of the component (A) is prepared, and then its transmission electron microscopic photograph is taken. Particle sizes of the soft component particles in the photograph are measured and the number and weight average particle sizes are calculated by the following formulas, respectively.

The number average particle size ($D_1$): $\Sigma niDi/\Sigma ni$

The weight average particle size ($D_4$): $\Sigma niDi^4/\Sigma niDi^3$ wherein Di is a particle size, and ni is a number of particles having the particle size of Di.

A content of the component (B) is not less than 0.1 part by weight based on the weight of 100 parts by weight of the component (A). When the content is less than 0.1 part by weight, a sufficient impact resistance can not be attained. Although, an upper limit of the component (B) is not particularly limited in the present invention, it is usually about 10 parts by weight based on 100 parts by weight of the component (A). Even when it exceeds about 10 parts by weight, no additional improvement of the impact strength is observed as compared with that attainable by the addition of about 10 parts by weight of the component (B).

The content of the component (B) in the styrenic resin composition of the present invention can be measured by preparing a very thin slice of the composition, taking a transmission electron microscopic photograph, calculating a percentage of areas of the component (B) occupying in the whole areas, and then converting the percentage to the content of the component (B). Alternatively, the content can be measured by a method comprising measuring an absorption peak using a spectrometer such as NMR, IR or the like and calculating the content from the absorption peak, or a method comprising fractionating the component (B) using a solvent.

The solubility parameter (SP) of the component (B) used in the present invention is from 8.45 to 8.70. When the solubility parameter is less than 8.45 or higher than 8.70, the improvement of the impact strength is not sufficient.

Herein, the solubility parameter is defined as an attracting force between molecules according to a Hildebrand-Scatchard theory. The theory is described in a common textbook of polymer chemistry such as, for example, "The Solubility of Nonelectrolytes", Third Edition, Reinhold Publishing Corp., New York, 1949, Chem. Rev., 8, 321(1931), and the like.

As known, the solubility parameter can be measured experimentally by a viscosity method, a swelling method and the like, or calculated from the molecular structure. However, the values obtained somewhat differ from each other depending on the methods used.

Herein, there is used a method for calculating the solubility parameter from the molecular structure which is proposed by Small. The method and the theory are described in detail in Journal of Applied Chemistry, 3, pp 71 to 80 (1953). According to the literature, the solubility parameter is calculated by the following formula:

$$SP = \frac{\sum_i Fi}{V} = \frac{\rho \cdot \sum_i Fi}{M}$$

wherein Fi is a molar attracting force of a structural group which constitutes a molecule such as an atom, an atomic group or a bond type, V is a molar volume, ρ is a density, and M is a molecular weight of a compound or a molecular weight of a monomer in the case of a polymer molecule. As the value of Fi, those of Small described in the foregoing literature are used.

For calculating the solubility parameter value of the copolymer, the following formula is used on the supposition that an additive property is valid regarding ρ, $\Sigma F_i$ and M, $$SP = \frac{\left(\sum_k m_k \rho_k\right) \cdot \left(\sum_k m_k F_k\right)}{\sum_k m_k M_k}$$

wherein $\rho_k$, $F_k$ and $M_k$ are a density of homopolymer of a monomer constituting the copolymer, a molar attracting force and a molecular weight, respectively, and $m_k$ is a molar fraction of each monomer of the copolymer.

The component (B) used in the present invention is a polymer comprising no aromatic vinyl compound unit therein. When the styrenic resin composition contains as the component (B) a polymer comprising the aromatic vinyl compound unit therein, the impact resistance is low.

As the aromatic vinyl compound, there are exemplified styrene, α-alkyl substituted styrenes such as α-methylstyrene and the like, nucleus substituted alkylstyrenes such as p-methylstyrene and the like.

The polymer having a solubility parameter of from 8.45 to 8.70 used as the component (B) in the present invention includes, for example, copolymers comprising ethylene and one or more vinyl monomers selected from unsaturated carboxylic acids, unsaturated carboxylic acid esters and vinyl acetate. Examples thereof are ethylene-unsaturated carboxylic acid copolymers, ethylene-unsaturated carboxylic acid ester copolymers, ethylene-vinyl acetate copolymers, ethylene-unsaturated carboxylic acid ester-vinyl acetate terpolymers, copolymers of ethylene and two or more unsaturated carboxylic acid esters, and the like.

Examples of the unsaturated carboxylic acid are acrylic acid and methacrylic acid. Examples of the unsaturated carboxylic acid ester are ethyl acrylate, methyl acrylate, 2-ethylhexyl acrylate, stearyl acrylate, glycidyl acrylate, methyl methacrylate, ethyl methacrylate, 2-ethylhexyl methacrylate, stearyl methacrylate, glycidyl methacrylate and the like.

Preferable examples of the copolymers are ethylene-acrylic acid copolymer, ethylene-methacrylic acid copolymer, ethylene-methyl methacrylate copolymer, ethylene-ethyl methacrylate copolymer, ethylene-ethyl acrylate copolymer, ethylene-methyl acrylate copolymer, ethylene-vinyl acetate copolymer, ethylene-methyl acrylate-glycidyl methacrylate copolymer, ethylene-methyl methacrylate-glycidyl methacrylate copolymer, ethylene-vinyl acetate-glycidyl methacrylate copolymer, and the like.

A ratio of the foregoing vinyl monomer to ethylene in the copolymer can be appropriately determined so as to obtain a desired copolymer having a solubility parameter of from 8.45 to 8.70. A preferable content of the vinyl monomer in the copolymer is preferably from 5 to 60% by weight, more preferably from 20 to 40% by weight.

There is no limitation regarding the bonding type between the vinyl monomer and ethylene in the copolymer (e.g. random, block, alternating, etc.).

Although a melt flow rate of the copolymer is not particularly limited, it is preferably from about 1 to 500 g/10 minutes, more preferably from 10 to 50 g/10 minutes, when measured according to JIS K7210 at 190° C. under a load of 2.16 kgf.

The rubber-modified styrenic resin used as the component (A) for the production of the styrenic resin composition in accordance with the present invention is novel and can be prepared by forming a liquid mixture of the rubbery polymer and the styrenic monomer or a mixture of the styrenic monomer and the compound copolymerizable therewith, and subjecting the liquid mixture to polymerization according to bulk polymerization or bulk/suspension two stage polymerization. The polymerization can be carried out at a temperature of 80 to 180° C. in the presence of an initiator and a chain transfer agent using a multiple stage polymerization vessel equipped with a stirrer as described in European Patent No. 0113067. The reaction conditions such as a concentration of the rubbery polymer, a stirring rate, a polymerization temperature, an amount of the initiator, a conversion and the like are controlled so as to obtain a desired rubber-modified styrenic resin satisfying the conditions of the component (A).

An industrially advantageous process for the production of the rubber-modified styrenic resin is illustrated as follows.

In a first reaction zone such as a polymerization vessel equipped with a stirrer, 100 parts by weight of a liquid mixture is prepared using 6.5 to 14 parts by weight of the foregoing polybutadiene, 3 to 6 parts by weight of a solvent such as ethylbenzene and the balance of styrene, and 50 to 300 ppm by weight of a chain transfer agent such as t-dodecylmercaptan and 50 to 500 ppm by weight of a polymerization initiator such as peroxides are additionally mixed therewith. Then, polymerization is continued at a temperature of preferably from 120 to 140° C. at a stirring rate of preferably from 30 to 180 rpm to a conversion of preferably from 20 to 45%. Successively, the content in the first reaction zone is transferred to another reaction zone such as a liquid filled type polymerization vessel, and the polymerization is continued at a temperature of preferably from 130 to 160° C. to a conversion of preferably from 70 to 85%. Thereafter, the resulting reaction mixture is passed through a deaeration zone kept at a temperature of 250 to 265° C. to evaporate volatile matters, thereby obtaining the desired rubber-modified styrenic resin as the component (A).

The rubber-modified styrenic resin composition in accordance with the present invention can be produced by blending a predetermined amount of the thus obtained rubber-modified styrenic resin, namely the component (A), and a predetermined amount of the polymer having the above-defined solubility parameter, namely the component (B). The blending of both components can be carried out by dry-blending using a mixing machine such as Henschel mixer, a tumbler mixer or the like, or molten-blending at a temperature of 180 to 260° C. using a mixing machine such as a single or twin screw extruder, a Banbury mixer and the like, followed by pelletization. If desired, additives such as an antioxidant, an ultraviolet ray absorber, a lubricant, an antistatic agent, a mineral oil and the like may be incorporated in the styrenic resin composition. These additives may be added in the course of the blending procedure or the polymerization process for obtaining the component (A).

The obtained rubber-modified styrenic resin composition can find its application in an injection molded article field, an extruded sheet field and a foam article field, in which the properties of the styrenic resin composition of the present invention can be best used.

An injection molded article comprising the rubber-modified styrenic resin composition of the present invention can be obtained using a conventional injection molding machine.

An extrusion molded article comprising the rubber-modified styrenic resin composition of the present invention can be obtained using a conventional extrusion molding machine. The extrusion molding method is not particularly limited, and there are exemplified a method comprising melting the styrenic resin composition in the extruder, and extruding it through a T-die, a method comprising extruding the molten resin composition from the extruder to form a sheet, and then biaxially stretching it in a tenter or inflation manner.

A foam article comprising the rubber-modified styrenic resin composition of the present invention can be obtained in a known manner. The foaming method is not particularly limited. There are exemplified a method comprising melting a mixture of a decomposition type foaming agent and the styrenic resin composition in an extruder and then foaming the molten mixture; a method comprising melting the styrenic resin composition in an extruder, introducing an evaporation type foaming agent into the molten resin through a middle part of a cylinder, kneading them and foaming the mixture; a method comprising impregnating a small pellet or bead of the styrenic resin composition with an evaporation type foaming agent in an extruder or in an aqueous suspension, and foaming the resulting pellet or bead with steam; and the like.

Examples of the decomposition type foaming agent are azodicarbonamides, trihydrazinotriazines, benzenesulfonyl semicarbazides and the like, and examples of the evaporation type foaming agent are propane, n-butane, i-butane, n-pentane, i-pentane, hexane, heptane, freon and the like.

The injection and extrusion molded articles are particularly useful as armoring materials for electric appliances, business equipments, telephones and office automation equipments, and as wrapping materials for food containers. The foam article is particularly useful as cushioning materials capable of absorbing impact to protect glass products, precision machines and the like.

The present invention is illustrated in more detail with reference to the following Examples, which are only illustrative and not limitative for the present invention.

In Examples, % is by weight unless otherwise specified.

Data shown in Examples were obtained by the measuring method mentioned below.

(1) Vicat softening point (heat resistance):

Measured according to JIS K7206 B.

(2) Izod impact strength:

Measured according to JIS K 7110, thickness: 3.0 mm, with notch, at 23° C.

(3) Flexural modulus (rigidity):

Measured according to JIS K7203, at 23° C.

(4) Falling weight impact (plane impact resistance):

Measured according to ASTM D3763 as follows;

A flat plate having a thickness of 2 mm was injection-molded. Using "falling weight graphic impact tester" manufactured by Toyo Seiki Manufacturing Co., a weight of 7.5 kg is spontaneously fallen from a height of 80 cm on a surface of the plate to completely break or pass through the plate by a striker which was attached to a lower end of the weight. Then, an energy required therefor was measured. The measuring temperature was 23° C. The molding machine used was IS-150E manufacture by Toshiba Corp., the mold temperature was 40° C., and the sample sizes were 150×90×2 mm.

(5) Surface gloss (surface appearance)

A flat plate having a thickness of 2 mm was injection-molded, and gloss at a center portion thereof was measured according to a 45° mirror surface gloss measuring method of JIS K7105. The molding machine used was IS-150E manufacture by Toshiba Corp., the mold temperature was 40° C., and the sample sizes were 150×90×2 mm.

EXAMPLES 1 AND 2 AND COMPARATIVE EXAMPLES 1 TO 5

A mixture of the components (A) and (B) shown in Tables 1 and 2, respectively, in respective amounts shown in Table 3 was molten, kneaded and pelletized by a 40 mm φ extruder at 220° C. to obtain pellets. The obtained pellets were injection-molded to form a test piece and a test flat plate, respectively, which were then subjected to the foregoing measurements, thereby evaluating the physical properties. The results were as shown also in Table 3.

The component (A) used in Examples and Comparative Examples;

A1: Sumibrite TL3000 manufactured by Sumitomo Chemical Co., Ltd.

A3: Sumibrite M584 manufactured by Sumitomo Chemical Co., Ltd.

A2 was synthesized by the following method.

In a continuous stirred type tank reactor, a liquid mixture of 9.5% of polybutadiene (manufactured by Asahi Chemical Industry Co., Ltd., trade name: D35), 1.6% of mineral oil, 4.0% of ethylbenzene, 0.02% of t-dodecylmercaptan, 0.02% of a peroxide initiator (manufactured by NOF Corp., trade name: Perhexa 3M) and 84.9% of styrene was supplied and polymerized at a temperature of 125° C. at a stirring rate of 180 rpm to a conversion of 35%. Subsequently, the resulting polymerization mixture was transferred to a liquid filled type reactor and polymerized to a conversion of 80%. A content was transferred to an evacuation vessel kept at 260° C. to remove volatile components. The resulting polymer was pelletized to obtain a pellet form rubber-modified styrenic resin.

The components (B) used;

B1: Ethylene-methyl methacrylate copolymer (manufacture by Sumitomo Chemical Co., Ltd., trade name: Acryft WM403, methyl methacrylate content: 38%, melt flow rate: 15 g/10 minutes)

B2: Polypropylene (manufacture by Sumitomo Chemical Co., Ltd., trade name: Noblen AD571, melt flow rate: 0.2 g/10 minutes)

B3: Styrene-methyl methacrylate copolymer (manufacture by Nippon Steel Chemical Co., Ltd., trade name: Estyrene MS200, methyl methacrylate content: 20%, melt flow rate: 0.2 g/10 minutes)

The melt flow rate was measured according to JIS K7210 at a temperature of 190° C. under a load of 2.16 kgf. The solubility parameter (SP) of the component (B) is shown in Table 2.

The results shown in Table 3 demonstrate that the rubber-modified styrenic resin compositions of the present invention are much more improved in both of Izod impact resistance and plane impact resistance and exhibit a high level of rigidity and gloss and an excellent impact resistance/gloss balance, while retaining excellent moldability.

TABLE 1

| Component (A) | A1 | A2 | A3 |
|---|---|---|---|
| Structure of soft component particles | single occlusion | Salami | Salami |
| Number average particle size (μm): $D_1$ | 0.19 | 0.25 | 0.70 |
| Weight average particle size (μm): $D_4$ | 0.25 | 0.41 | 0.80 |
| $D_4/D_1$ | 1.32 | 1.64 | 1.13 |
| content of rubbery polymer (%) | 15.0 | 11.8 | 6.7 |
| Content of soft component particle (%) | 25.0 | 26.6 | 16.0 |

TABLE 2

| Component (B) | B1 | B2 | B3 |
|---|---|---|---|
| Density ρg/cm$^3$ | 0.96 | 0.90 | 1.08 |
| Molecular weight of monomer unit M | 38.5 | 42.0 | 103.2 |
| Σ Fi | 341 | 375 | 872 |
| SP | 8.50 | 8.04 | 9.13 |

TABLE 3

| | | Example 1 | Example 2 | Comparative Example 1 | Comparative Example 2 | Comparative Example 3 | Comparative Example 4 | Comparative Example 5 |
|---|---|---|---|---|---|---|---|---|
| Formulation | Kind of component (A) | A2 | A2 | A2 | A2 | A1 | A3 | A2 |
| | Part by weight of component (A) | 100 | 100 | 100 | 100 | 100 | 100 | 100 |
| | Kind of component (B) | B1 | B1 | B2 | B3 | B1 | B1 | — |
| | Part by weight of component (B) | 4 | 8 | 8 | 8 | 4 | 4 | 0 |
| Evaluation | Plane impact resistance (J) | 18.3 | 18.5 | 5.7 | 9.6 | 22.6 | 11.0 | 9.2 |
| | Izod impact resistance (kgf · cm/cm$^2$) | 14.8 | 16.4 | 2.1 | 12.5 | 5.7 | 8.0 | 12.7 |
| | Vicat softening point (° C.) | 88.3 | 84.8 | 89.9 | 91.6 | 88.6 | 92.0 | 90.8 |
| | Surface gloss (%) | 99 | 98 | 96 | 101 | 101 | 97 | 99 |
| | Flexural modulus (kgf/cm$^2$) | 17500 | 16600 | 17300 | 19400 | 18300 | 22500 | 18800 |

Although the present invention has been described in connection with preferred embodiments thereof, many other variations and modifications and other uses will become apparent to those skilled in the art without departing from the scope of the invention. It is preferred, therefore, that the present invention not be limited by the specific disclosure herein, but only by the appended claims.

What is claimed is:

1. A rubber-modified styrenic resin composition comprising ;

100 parts by weight of a rubber-modified styrenic resin as a component (A) and 0.1 part by weight or more of a polymer as a component (B), the component (A) being obtained by forming a liquid mixture of a rubbery polymer and a styrenic monomer, and subjecting the liquid mixture to polymerization, thereby obtaining the desired component (A), in which soft component particles containing the rubbery polymer are dispersed, said soft component particles having a salami structure and a weight average particle size of from 0.1 to 0.6 μm, and a content of said soft component particles being from 20 to 35% by weight based on the weight of the component (A), and the component (B) having a solubility parameter (SP) of from 8.45 to 8.70 Cal. ½/C.C. ½ and comprising no aromatic vinyl compound unit.

2. The styrenic resin composition according to claim 1, wherein the rubbery polymer used for obtaining the component (A) is a polybutadiene rubber or a styrene-butadiene block copolymer.

3. The styrenic resin composition according to claim 1, wherein the rubbery polymer used for obtaining the component (A) is a polybutadiene rubber.

4. The styrenic resin composition according to claim 3, wherein the polybutadiene rubber has a viscosity of from 20 to 200 cps.

5. The styrenic resin composition according to claim 1, wherein the styrenic monomer used for obtaining the component (A) is styrene or a $C_{1-4}$ alkyl-substituted styrene.

6. The styrenic resin composition according to claim 1, wherein the soft component particles have a particle size of from 1.1 to 1.8 in terms of a ratio of the weight average particle size defined in claim 1 to a number average particle size.

7. The styrenic resin composition according to claim 1, wherein the component (B) is a copolymer comprising ethylene and one or more vinyl monomers selected from unsaturated carboxylic acids, unsaturated carboxylic acid esters and vinyl acetate.

8. The styrenic resin composition according to claim 7, wherein the copolymer is ethylene-acrylic acid copolymer, ethylene-methacrylic acid copolymer, ethylene-methyl methacrylate copolymer, ethylene-ethyl methacrylate copolymer, ethylene-ethyl acrylate copolymer, ethylene-methyl acrylate copolymer, ethylene-vinyl acetate copolymer, ethylene-methyl acrylate-glycidyl methacrylate copolymer, ethylene-methyl methacrylate-glycidyl methacrylate copolymer or ethylene-vinyl acetate-glycidyl methacrylate copolymer.

9. The styrenic resin composition according to claim 1, wherein the styrenic resin composition comprises the component (B) in an amount of from 0.1 to about 10 parts by weight.

10. An injection molded article comprising the styrenic resin composition according to claim 1.

11. An extrusion molded article comprising the styrenic resin composition according to claim 1.

12. A foam article comprising the styrenic resin composition according to claim 1.

13. Method of forming articles comprising shaping the styrenic resin composition according to claim 1 to form shaped articles.

* * * * *